United States Patent [19]

Pollard

[11] Patent Number: 4,629,322
[45] Date of Patent: Dec. 16, 1986

[54] MATERIAL ANALYSIS USING REFLECTED LIGHT

[75] Inventor: John H. Pollard, Alexandria, Va.

[73] Assignee: The United States of America as represented by the Secretary of the Army, Washington, D.C.

[21] Appl. No.: 665,893

[22] Filed: Oct. 29, 1984

[51] Int. Cl.$^4$ .............................................. G01J 3/42
[52] U.S. Cl. .................................. 356/300; 356/319; 356/446
[58] Field of Search ............... 356/300, 303, 319, 326, 356/445–448, 72

[56] References Cited
U.S. PATENT DOCUMENTS
4,142,802 3/1979 Pollak et al. .................. 356/445 X Primary Examiner—F. L. Evans
Attorney, Agent, or Firm—Max L. Harwell; Aubrey J. Dunn; Anthony T. Lane

[57] ABSTRACT

An apparatus and method for determining the relative proportions of two elements of a ternary compound from light reflected off a sample of the compound. The light is varied in wavelength and a graph of reflectance vs wavelength is stored. For a given compound of general form $A_xB_{1-x}C$, x may be determined by converting the stored graph to a graph of reflectance vs photon energy of the light, determining the photon energy of the light for the longest wavelength peak on the converted graph, and computing x from the equation $E_1 = a + bx + cx^2$ wherein a, b, and c are predetermined constants, and $E_1$ is the photon energy in electron volts of the peak of interest.

1 Claim, 4 Drawing Figures

MATERIAL ANALYSIS USING REFLECTED LIGHT

The invention described herein may be manufactured, used, and licensed by the U.S. Government for governmental purposes without the payment of any royalties thereon.

BACKGROUND OF THE INVENTION

This invention is in the field of non-destructive quantitive material analysis using light. In particular, it is concerned with the reflectance of light from a material surface, and how the reflectance varies with wavelength. The constituents of a particular material may be known, but not their percentages in the material. A known technique of material analysis using reflected light is electroreflectance, in which a sample of the material is immersed in an electrolyte and subjected to a modulated electric field. At the same time, a light beam whose wavelength is varied in some predetermined manner is reflected from the sample onto a photodector. The curves thus obtained are indicative of the relative quantities of the constituents of the material in the sample. While this system gives extremely accurate results, it does have the disadvantages that it cannot be used for a sample in situ, nor can it be used to monitor a sample being processed. U.S. Pat. No. 4,142,802 shows such a known system.

SUMMARY OF THE INVENTION

The instant invention is a method and appartus for determining two constituents of a compound having a general equation $A_xB_{1-x}C$. In particular, the longest wavelength peak of a light wavelength vs reflectance graph from a sample of the compound is indicative of x in the compound equation above. The apparatus includes a broad spectrum light source directed through a variable monochrometer and a beamsplitter onto a sample of the compound. The amount of light reflected by the sample is compared to a portion of the light reflected by the beam splitter to determine the percentage reflected by the sample. A graph of this percentage is stored, and the peak or peaks are determined. The energy (in eV) of the light for the longest wavelength of these peaks may be used to directly compute x in the equation above.

DETAILED DESCRIPTION OF THE INVENTION

Figure 1:
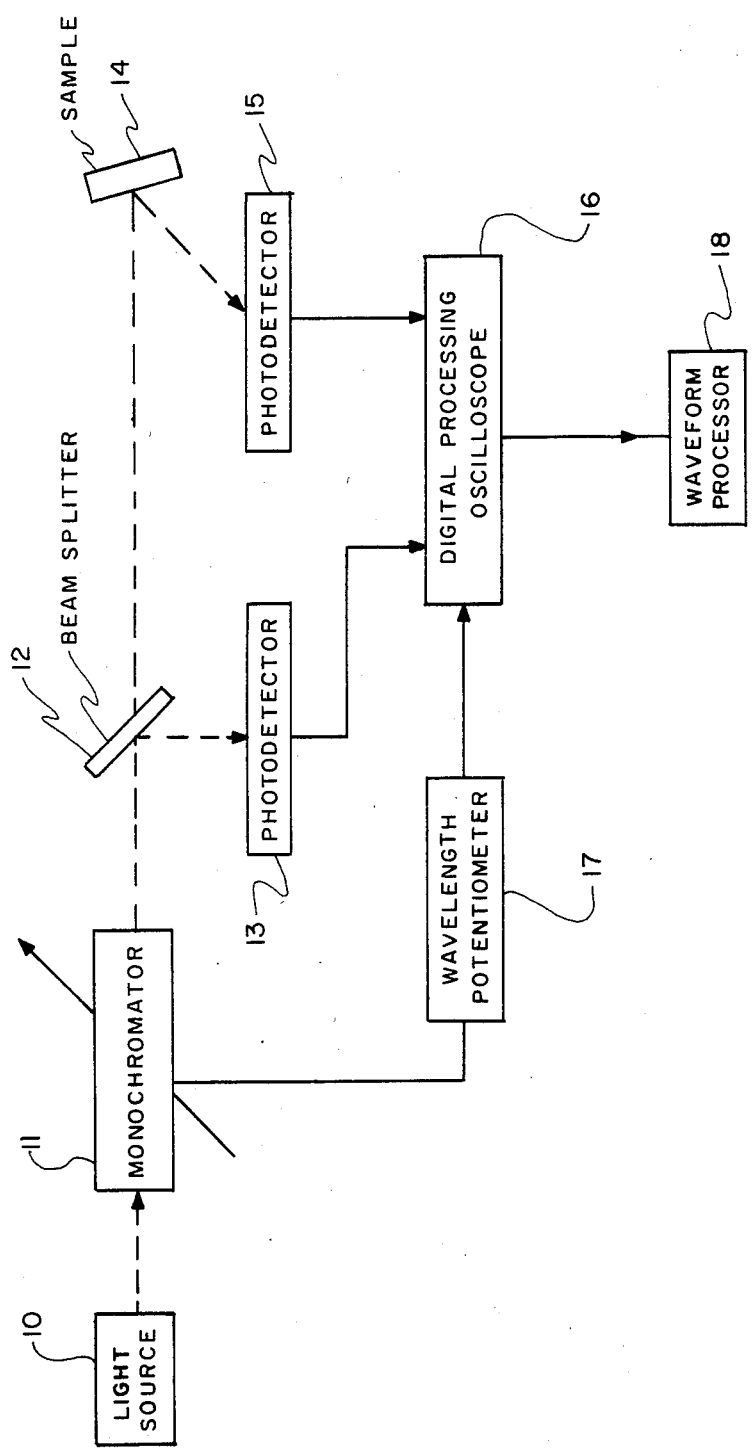
FIG. 1 is a schematic diagram of the inventive apparatus.

The invention may be best understood when this description is taken in conjunction with the drawings. Referring to FIG. 1, we see a broad spectrum light source 10 directing a light beam onto wavelength-variable monochrometer 11. Source 10 may be a xenon lamp or equivalent; monochrometer 11 may be an adjustable diffraction grating or equivalent. The light passed by 11 is directed on beam splitter 12. A portion of this light is reflected as a reference beam onto photodetector 13, and the remainder is directed at near-normal incidence (not shown near-normal on the drawing) onto sample 14 of the compound. The light reflected from 14 falls on photodetector 15; 15 and 13 both feed into digital processing oscilloscope 16; 16 is also fed a voltage from wavelength potentiometer 17 indicative of the output wavelength of 11. The output from 13 and 15 feed two input channels of the oscilloscope, and the voltage from 17 controls the horizontal sweep of the oscilloscope. The particular oscilloscope which I use is a Tektronik Digital Processing Oscilloscope 7704A, with two Tektronik 7A22 differential amplifiers accepting inputs from 13 and 15, although other means may be used to plot reflectance vs wavelength. The signal output of 16 is processed in waveform processor 18, first to yield a plot of reflectivity as a function of incident photon energy. This new plot, which may have one or more peaks corresponding to peaks on the original reflectivity vs wavelength curve, is further processed to determine the photon energy in eV for the centroid of the material $E_1$ peak, wherein $E_1$ is the longest wavelength peak. From this $E_1$, x can be computed for $Cd_xHg_{1-x}Te$ in accordance with the following formula: $E_1 = 2.071 + 0.605x + 0.559x^2$. The coefficients of this formula are determined as explained below. Processor 18 is a Tektronik Waveform Processor WP 1221.

Figure 3:
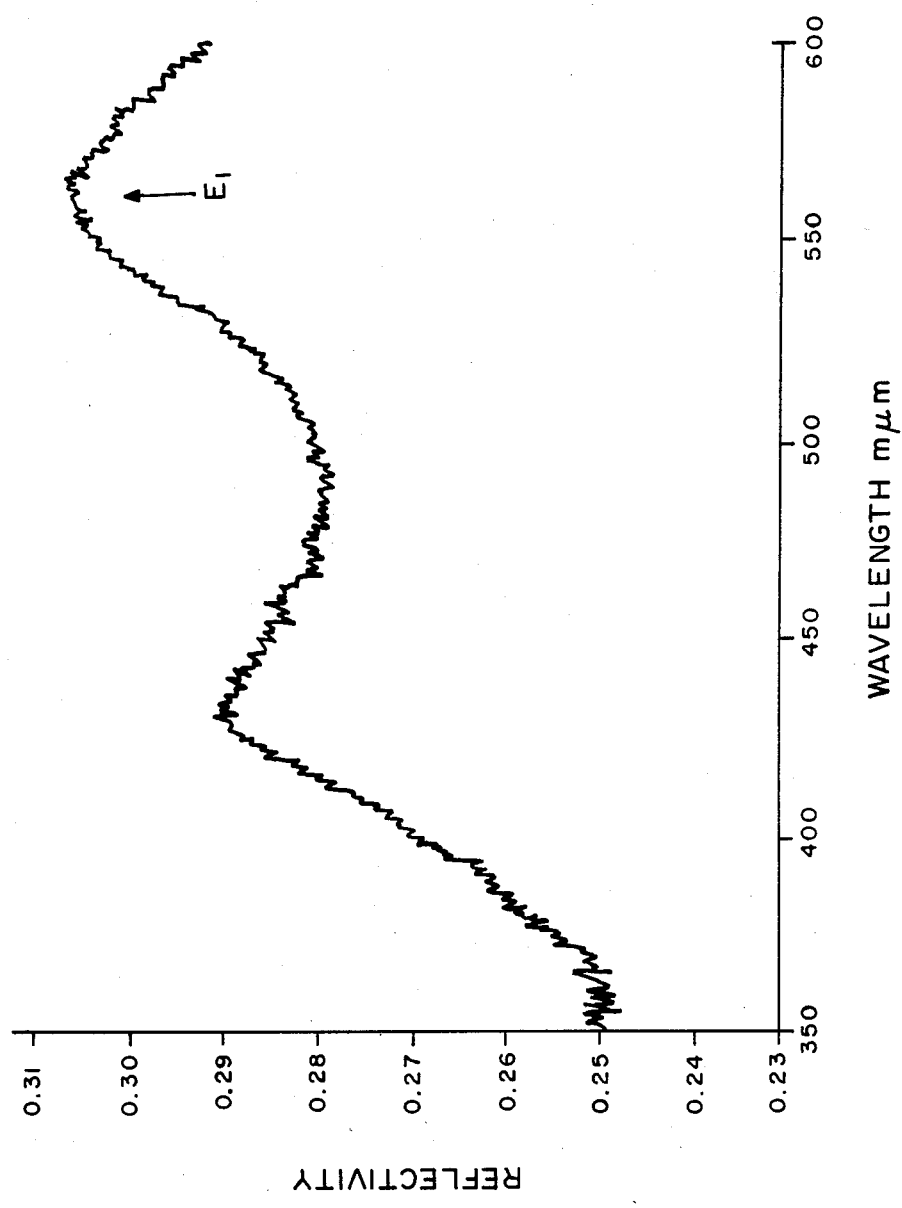
FIG. 3 is a reflectivity curve for a particular material.
Figure 4:
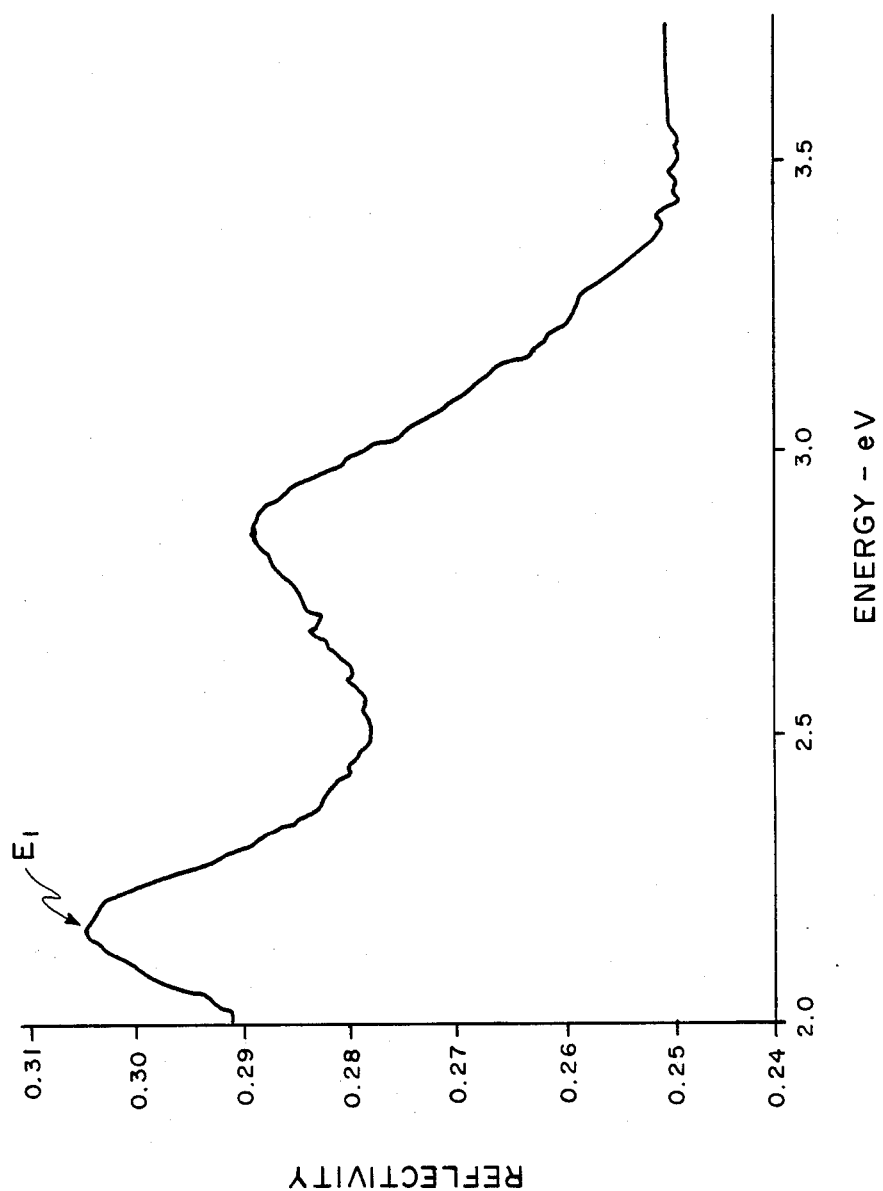
FIG. 4 is an energy curve for a particular material.

Referring to FIGS. 3 and 4, we see curves for a particular $Cd_xHg_{1-x}Te$ sample, for which we wish to determine x. As can be seen of FIG. 3, the reflectivity response of the sample has a peak between 500 and 600 m$\mu$m, and another between 400 and 450 m$\mu$m. The longer wavelength peak, designated $E_1$, is the peak of interest. FIG. 4 is a smoothed curve of reflectivity vs energy; $E_1$ lies between 2.0 and 2.5 eV. The value in eV of the $E_1$ peak may be determined by various ways—I determined $E_1$ by integrating the area under the $E_1$ peak and choosing the energy position with equal areas above and below the apparent peak value. For the particular sample shown, I determine $E_1$ to be approximately 2.172 eV. From this I compute $x=0.147$ and the compound to be $Cd_{0.147}Hg_{0.853}Te$.

Figure 2:
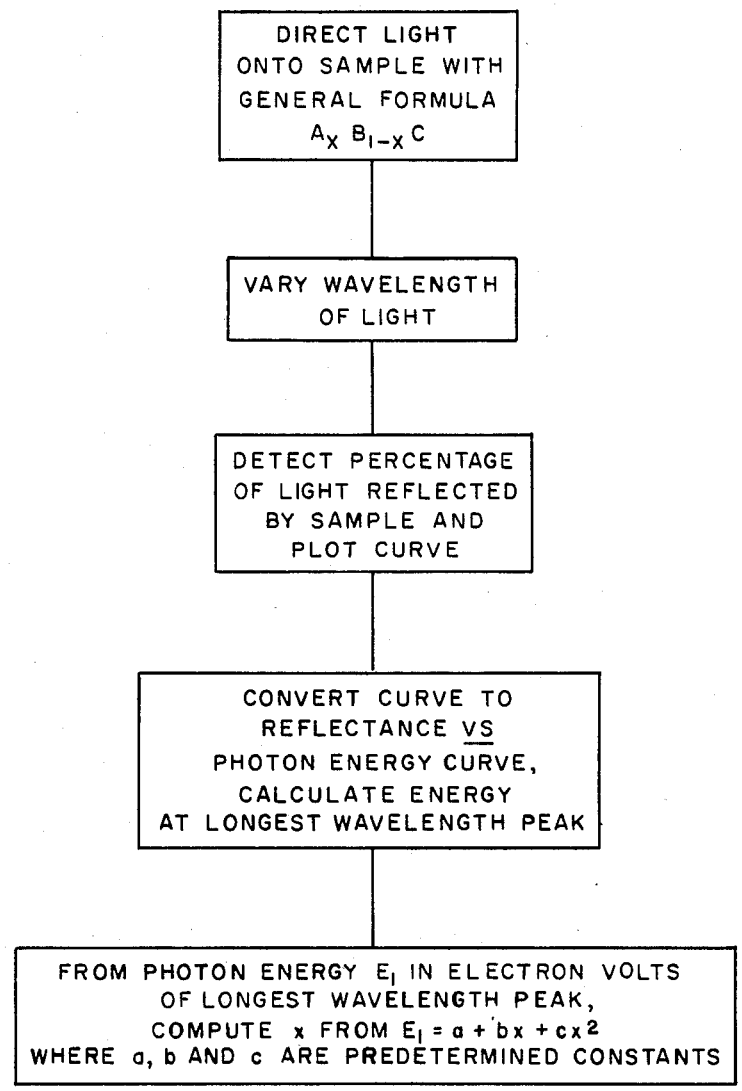
FIG. 2 is a flow chart of the inventive method.

The method of the invention is essentially the same as described above in the operation of the apparatus. Specifically, referring to FIG. 2, the method includes the steps of directing light (and varying its wavelength) onto a sample of material having the general formula $A_xB_{1-x}C$, detecting the percentage of light reflected and plotting a refectance vs light wavelength curve, converting this curve to a reflectance vs photon energy curve and calculating the photon energy for the longest wavelength peak of the new curve peaks, and computing x from the energy in eV of this peak.

Whenever the term "longest wavelength" is used above, it should be understood that I mean a wavelength of light below the semiconductor bandgap, in the xenon emission spectrum. This xenon spectrum includes many lines which may be used to calibrate the scale of an oscilloscope or a plotter.

The coefficients a, b, and c are directly determined by the position of the $E_1$ transition for the two compositions AC, BC($x=0$ and $x=1$ respectively) and for a third intermediate composition of known x-value. For example, in the case of $Cd_xHg_{1-x}Te$, Hansen, Schmit, and Casselman, in the "Journal of Applied Physic", Vol 53, page 7099, published in 1982, teach that the composition may be determined from the position of the measured absorption edge and this can be used to determine the intermediate composition x-value used in the determination of the coefficients a, b, and c.

As well as determining the composition of a particular semiconductor material, this invention may be used both for mapping and profiling of a sample. The mapping is done by testing the sample in a two-dimensional array of spots on its surface. Profiling is done by performing successive mappings as layers of the sample are etched away or otherwise removed.

I claim:

1. A method for quantitively dry testing a sample of ternary compound of the form $A_xB_{1-x}C$ which includes the steps of:

directing a variable wavelength light beam onto a surface of said compound;

varying the wavelength of said light beam in a predetermined manner;

detecting the reflectance of light from said surface as said wavelength is varied and plotting a graph thereof;

replotting said graph as a graph of reflectance versus photon energy of the light; and determining the longest wavelength peak of said reflectance versus photon energy graph whereby the photon energy of said longest wavelength is designated $E_1$; and computing x from the equation $E_1 = a + bx + cx^2$, wherein a, b, and c are predetermined constants for the compound.

* * * * *